(12) United States Patent
Obara et al.

(10) Patent No.: US 9,934,771 B1
(45) Date of Patent: Apr. 3, 2018

(54) MUSIC MODELING

(71) Applicant: INTERNATIONAL BUSINESS MACHINES CORPORATION, Armonk, NY (US)

(72) Inventors: Yachiko Obara, Tokyo (JP); Shohei Ohsawa, Tokyo (JP); Takayuki Osogami, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/629,250

(22) Filed: Jun. 21, 2017

Related U.S. Application Data

(63) Continuation of application No. 15/343,059, filed on Nov. 3, 2016, now Pat. No. 9,792,889.

(51) Int. Cl.
*G04B 13/00* (2006.01)
*G10H 1/00* (2006.01)

(52) U.S. Cl.
CPC ..... *G10H 1/0025* (2013.01); *G10H 2210/061* (2013.01); *G10H 2210/066* (2013.01); *G10H 2210/145* (2013.01); *G10H 2240/145* (2013.01); *G10H 2250/005* (2013.01); *G10H 2250/311* (2013.01)

(58) Field of Classification Search
CPC ....... G10H 2240/145; G10H 2210/056; G10H 2210/076; G10H 2210/115; G10H 2250/311; G10H 2210/031; G10H 2210/081; G10H 2240/131; G10H 2210/061; G10H 2240/135; G06N 5/02; G06N 5/022; G06N 7/005; G06N 3/02; G06N 3/0454

See application file for complete search history.

(56) References Cited

U.S. PATENT DOCUMENTS 7,034,217 B2   4/2006 Pachet
9,530,091 B2 * 12/2016 Hawkins ................ G06N 7/005
9,792,889 B1 * 10/2017 Obara ..................... G10H 1/0025
(Continued)

FOREIGN PATENT DOCUMENTS

JP      2015222882      12/2015

OTHER PUBLICATIONS

Dannenberg, et al., "Music Score Alignment and Computer Accompaniment", ACM, Aug. 2006, pp. 1-8, vol. 49, Issue 8.

(Continued)

*Primary Examiner* — Marlon Fletcher
(74) *Attorney, Agent, or Firm* — Tutunjian & Bitetto, P.C.; Vazken Alexanian

(57) ABSTRACT

A computer implemented method is provided for generating a prediction of a next musical note by a computer having at least a processor and a memory. A computer processor system is also provided for generating a prediction of a next musical note. The method includes storing sequential musical notes in the memory. The method further includes dividing, by the processor, the sequential musical notes into sections of a given length based on a Generative Theory of Tonal Music. The method also includes generating, by the processor, the prediction of the next musical note based upon a music model, the sections, and the sequential musical notes stored in the memory. The given length is determined based on one or more conditions.

20 Claims, 7 Drawing Sheets

(56) References Cited

U.S. PATENT DOCUMENTS

| | | | |
|---|---|---|---|
| 2003/0131715 A1* | 7/2003 | Georges | G10H 1/0025 84/609 |
| 2004/0089141 A1* | 5/2004 | Georges | G10H 1/0025 84/609 |
| 2008/0156176 A1* | 7/2008 | Edlund | G10H 1/0025 84/609 |
| 2008/0156178 A1* | 7/2008 | Georges | G10H 1/0025 84/645 |
| 2009/0173214 A1* | 7/2009 | Eom | G06F 17/30746 84/610 |
| 2009/0205481 A1* | 8/2009 | Kulkarni | G10H 1/0075 84/609 |
| 2015/0268921 A1* | 9/2015 | Georges | G05B 15/02 700/94 |
| 2016/0155056 A1 | 6/2016 | Shiozaki | |
| 2017/0103740 A1* | 4/2017 | Hwang | G10H 1/0025 |
| 2017/0206875 A1* | 7/2017 | Hwang | G10H 1/0025 |

OTHER PUBLICATIONS

Dubnov, et al., "Using Machine-Learning Methods for Musical Style Modeling", IEEE Computer Society, Aug. 2003, pp. 3-10.

Eck, et al, "A First Look at Music Composition using LSTM Recurrent Neural Networks", IDSIA / USI-SUPSI, Technical Report No. IDSIA-07-02, Jul. 2002, pp. 1-11.

Graves, et al., "Speech Recognition with Deep Recurrent Neural Networks", arXIV, Mar. 2013, pp. 1-5.

Hamanaka, et al., "Melody Morphing Method Based on Gttm", Proceedings of the International Conference on Machine Learning 08, Dec. 2008, pp. 1-4.

Boulanger-Lewandowski, et al., "Modeling Temporal Dependencies in High-Dimensional Sequences: Application to Polyphonic Music Generation and Transcription", Proceedings of the 29 th International Conference on Machine Learning, Jun. 2012, pp. 1-8.

Sutskever, "Sequence to Sequence Learning with Neural Networks", arXIV, Dec. 2014, pp. 1-9.

Everyone Piano, Forever Free Piano Software, available at http://www.everyonepiano.com/, Last donwloaded Aug. 9, 2016, 3 pages.

Hamanaka, et al., "Grouping Structure Generator Based on Music Theory GTTM", Transactions of Information Processing Society of Japan, Jan. 2007, pp. 284-299, vol. 48, No. 1.

List of IBM Patents or Patent Applications Treated as Related dated Jun. 21, 2017, 2 pages.

* cited by examiner

MUSIC MODELING

BACKGROUND

Technical Field

The present invention relates generally to music and, in particular, to music modeling using clock Long Short-Term Memory (LSTM).

Description of the Related Art

Modeling time-series data such as music, speech or sensor data is an important area of machine learning. Elements of time-series data of naturally occurring phenomena are predictable by sequences of elements in the same or similar data, because they often have patterns. These cues are referred to as "context".

Recurrent Neural Network (RNN) and Long Short-Term Memory (LSTM) are machine learning models which can use context. They have hidden layers, and learn sequences by using recurrent inputs.

LSTM is an extension of RNN, and its memory for storing context makes it possible to treat long-term data. The memory can be written and reset with reference to the contents of the memory. Without resetting, the contents of the memory eternally exist. The writing to and resetting of the memory are dependent on inputs and context. These dependencies are learned by neural networks using training data in the same way as RNN. The neuron layers for writing and resetting are respectively referred to as the input gate and the forget gate.

One problem with RNN and LSTM is that they take more time for learning the transition of context compared to a Hidden Markov Model (HMM). LSTM and RNN use Stochastic Gradient Descent (SGD) for updating weights, i.e., their parameters. In the case of LSTM, the transition of context (aka context transition) means the resetting of the memory realized by the firing of the forget gate. The firing of the forget gate is determined by a sigmoid function, and getting the norm of weights large enough to enable alternating firing between 0 and 1 takes a long time. This is because the derivative of the sigmoid function and learning rate is too small to get such a norm. The values of the derivative of the sigmoid function has a maximum of 0.25 and has the characteristic of becoming smaller as the weights become bigger. The learning rate is in inverse proportion to the time to learn the weights of a certain norm, but empirically, the learning rate is set smaller than 1. This is the reason why LSTM takes a lot of time for learning the transition of context. In the case of HMM, such problems do not happen because SGD is not necessary owing to the analytic solution of parameters.

Thus, there is a need for a LSTM-based method for music modeling that can exploit context.

SUMMARY

According to an aspect of the present invention, a computer implemented method is provided for generating a prediction of a next musical note by a computer having at least a processor and a memory. The method includes storing sequential musical notes in the memory. The method further includes dividing, by the processor, the sequential musical notes into sections of a given length based on a Generative Theory of Tonal Music. The method also includes generating, by the processor, the prediction of the next musical note based upon a music model, the sections, and the sequential musical notes stored in the memory. The given length is determined based on one or more conditions selected from the group consisting of: a note length for a beginning to an end of a note is greater than a note length threshold; a note difference between a time immediately before the note and a time immediately after the note is greater than a note difference threshold; a repeating melody; and music sections are substantially equal in length within a section length threshold.

According to another aspect of the present invention, a computer program product is provided for generating a prediction of a next musical note by a computer having at least a processor and a memory. The computer program product includes a non-transitory computer readable storage medium having program instructions embodied therewith, the program instructions executable by the computer to cause the computer to perform a method. The method includes storing sequential musical notes in the memory. The method further includes dividing, by the processor, the sequential musical notes into sections of a given length based on a Generative Theory of Tonal Music. The method also includes generating, by the processor, the prediction of the next musical note based upon a music model, the sections, and the sequential musical notes stored in the memory. The given length is determined based on one or more conditions selected from the group consisting of: a note length for a beginning to an end of a note is greater than a note length threshold; a note difference between a time immediately before the note and a time immediately after the note is greater than a note difference threshold; a repeating melody; and music sections are substantially equal in length within a section length threshold.

According to yet another aspect of the present invention, a computer processing system is provided for generating a prediction of a next musical note. The system includes a processor operably coupled to a memory. The processor is configured to store sequential musical notes in the memory. The processor is further configured to divide the sequential musical notes into sections of a given length based on a Generative Theory of Tonal Music. The processor is also configured to generate the prediction of the next musical note based upon a music model, the sections, and the sequential musical notes stored in the memory. The given length is determined based on one or more conditions selected from the group consisting of: a note length for a beginning to an end of a note is greater than a note length threshold; a note difference between a time immediately before the note and a time immediately after the note is greater than a note difference threshold; a repeating melody; and music sections are substantially equal in length within a section length threshold.

These and other features and advantages will become apparent from the following detailed description of illustrative embodiments thereof, which is to be read in connection with the accompanying drawings.

BRIEF DESCRIPTION OF DRAWINGS

The following description will provide details of preferred embodiments with reference to the following figures wherein.

DETAILED DESCRIPTION

The present invention is directed to music modeling using clock Long Short-Term Memory (LSTM). In an embodiment, the present invention can also use the Generative Theory of Tonal Music (GTTM).

In an embodiment, the present invention improves the accuracy of learning and predicting with respect to music modeling, by resetting a corresponding memory to zero at fixed intervals using a clock signal. In an embodiment, a concept referred to herein as "Clock-LSTM" is employed. Clock-LSTM refers to the combination of LSTM with the present invention. To reset the memory at fixed intervals, Clock-LSTM uses values of the forget gate multiplied by a clock signal. Thus, the present invention can be applied to a LSTM Recurrent Neural Network (RNN) modified to use clock-LSTM as described herein. In an embodiment, the LSTM RNN can include a forward pass stage and a back propagation stage. In an embodiment, the back propagation can use iterative gradient descent.

In the case of dynamic Boltzmann machines (DyBMs), the memory can be implemented by and/or otherwise involve eligibility traces and a FIFO queue. Eligibility traces are a basic mechanism of reinforcement learning that can be viewed in two ways as follows. In a first way, an eligibility traces can be considered as a bridge from Temporal Difference (TD) learning to Monte Carlo methods (forward view). In a second way, an eligibility trace is a temporary record of the occurrence of an event, such as the visiting of a state or the taking of an action (backward view). The trace marks the memory parameters associated with the event as eligible for undergoing learning changes.

In an embodiment, the present invention improves the prediction of time-series data by resetting the memory at appropriate times which are determined by prior knowledge. In the case of music, the prior knowledge can be music segments. The size of music segments can vary from a measure to several measures. The music segments can be identified by using, for example, the Generative Theory of Tonal Music. GTTM is used to analyze music by features of its hierarchical and periodical structure. In an embodiment, GTTM can be applied to automatic compositions.

GTTM focuses on four hierarchical systems that shape human musical intuition. Each system is expressed in a hierarchical structure where dominant regions include smaller subordinate elements and where equal elements exist contiguously within a given hierarchical level. In GTTM, any level can be small-scale or large-scale depending on the size of its elements. The four hierarchical systems are as follows: grouping structure; metrical structure; time-span reduction; and prolongational reduction.

Figure 1:
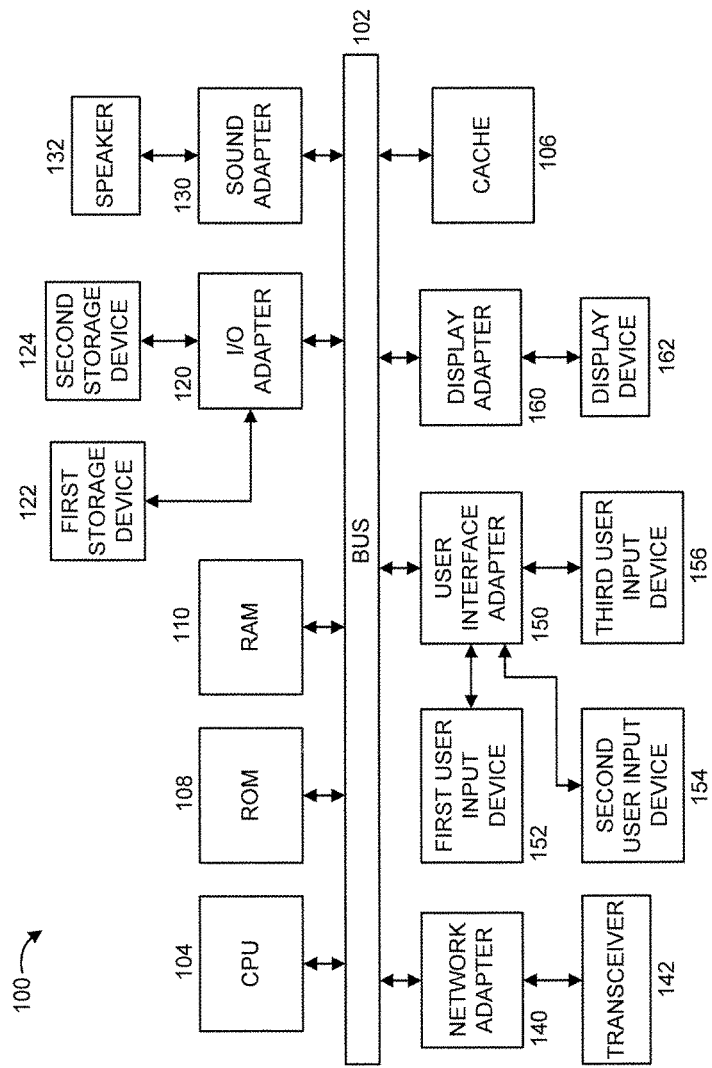
FIG. 1 shows an exemplary processing system to which the present invention may be applied, in accordance with an embodiment of the present invention.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
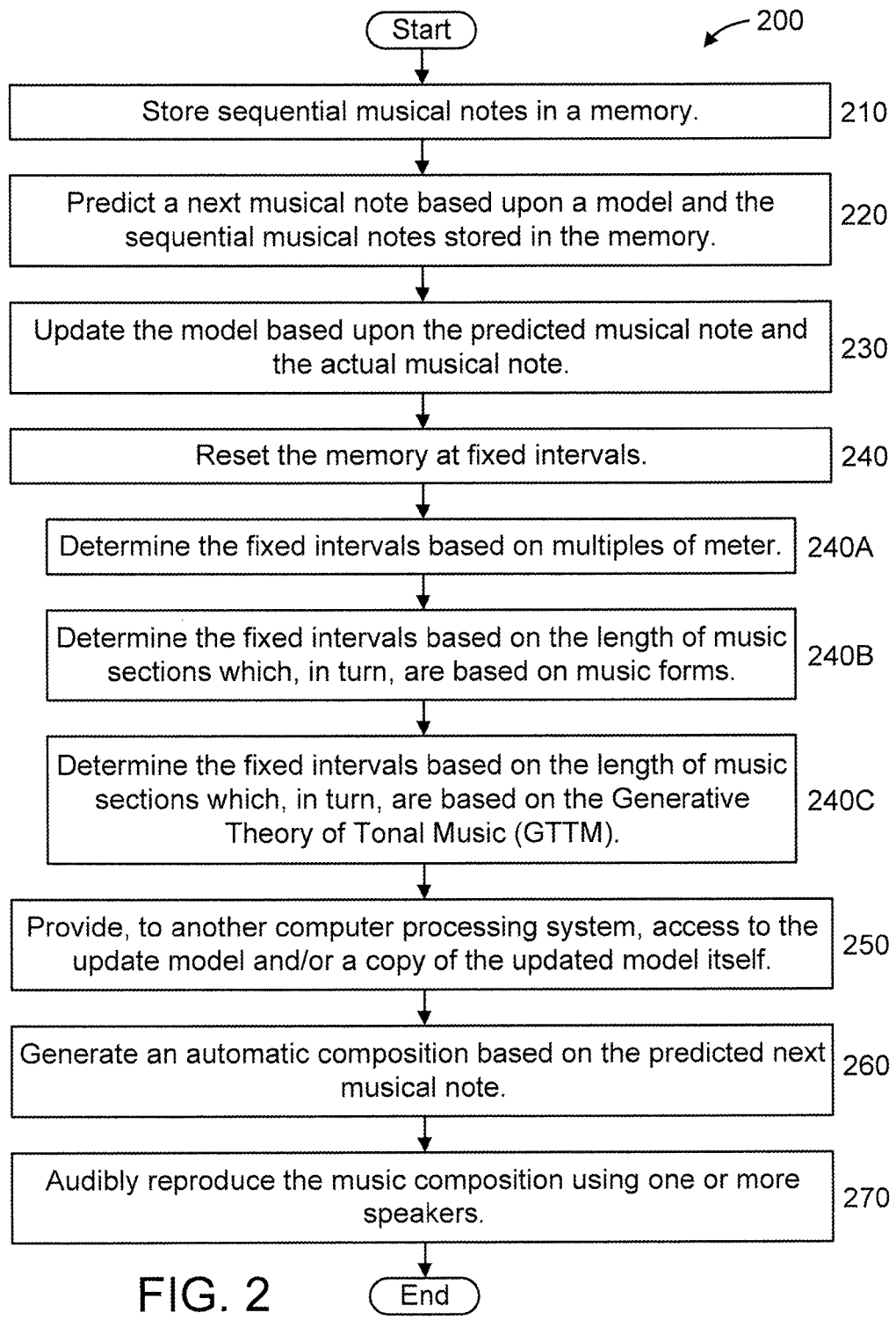
FIG. 2 shows an exemplary method for music modeling, in accordance with an embodiment of the present invention.

Further, it is to be appreciated that processing system 100 may perform at least part of the methods described herein including, for example, at least part of method 200 of FIG. 2.

Figure 6:
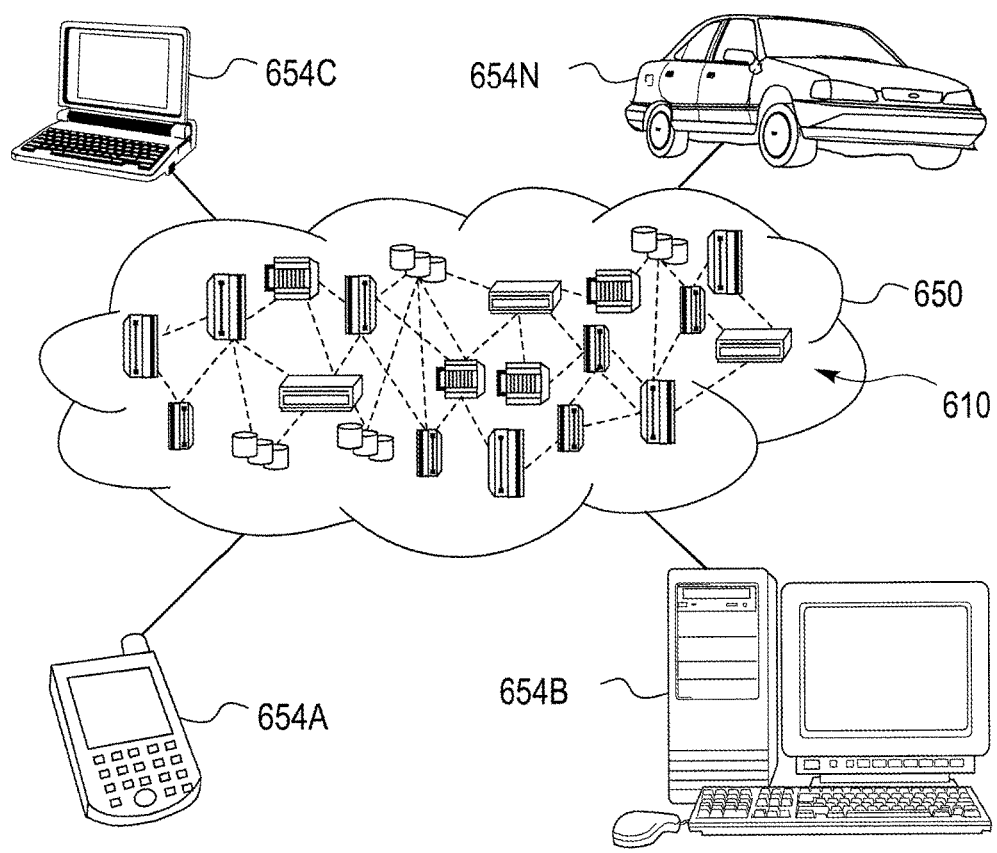
FIG. 6 shows an exemplary cloud computing environment, in accordance with an embodiment of the present invention.
Figure 7:
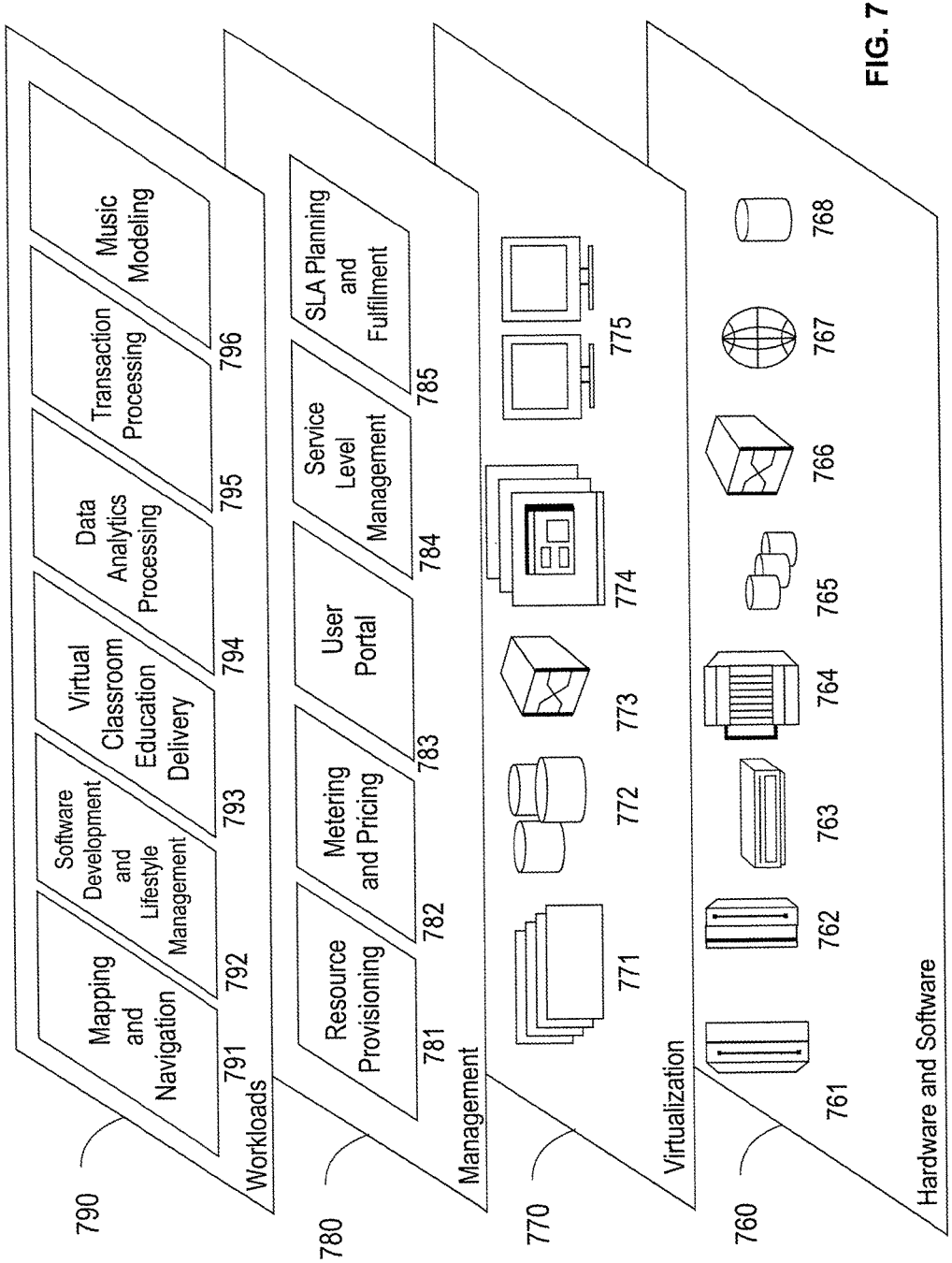
FIG. 7 shows an exemplary set of functional abstraction layers provided by the cloud computing environment shown in FIG. 6, in accordance with an embodiment of the present invention.

It is to be appreciated that system 100 can interface with other computer processing systems in order to provide music predictions in response to a query from one of the other computer processing systems. System 100 could provide one or more of the other computing processing systems access to, or copies of, one or more music models stored by system 100. FIGS. 6-7 shows various aspects of a cloud computer environment to which the present invention can be applied, in accordance with an embodiment of the present invention. One or more elements of system 100 can be implemented by one or more elements of FIGS. 6-7. Additionally, one or more elements in FIG. 1 can be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 100 are readily determined by one of ordinary skill in the art, given the teachings of the present invention provided herein, while maintaining the spirit of the present invention.

FIG. 2 shows an exemplary method 200 for music modeling, in accordance with an embodiment of the present invention. In particular, method 200 predicts the musical note at time step of t+1 from previous musical notes.

At step 210, store sequential musical notes in a memory.

At step 220, predict a next musical note based upon a model and the sequential musical notes stored in the memory.

At step 230, update the model based upon the predicted musical note and the actual one (i.e., the actual musical note for which the predicted musical note was generated).

At step 240, reset the memory at fixed intervals.

In an embodiment, step 240 includes step 240A and/or step 240B.

At step 240A, determine the fixed intervals based on multiples of meter.

At step 240B, determine the fixed intervals based on the length of music sections which, in turn, are based on music forms.

At step 240C, determine the fixed intervals based on the length of music sections which, in turn, are based on the Generative Theory of Tonal Music (GTTM).

At step 250, provide, to another computer processing system, access to the update model and/or a copy of the updated model itself.

At step 260, generate an automatic composition based on the predicted next musical note. For example, in an embodiment, the actual predicted next musical note can be used (e.g., directly or indirectly) to generate the composition. In an embodiment, the updated model (updated based on the predicted next musical note) can be used to generate the composition.

At step 270, audibly reproduce the music composition (generated at step 260) using one or more speakers.

It is to be appreciated that steps 260 and 270 can be performed by the same computer processing system as that used to perform steps 210 through 250 or can be performed by one or more different computer processing systems than that used to perform steps 210 through 250. Regarding the former situation where one of more different computer processing systems are used, the prediction of step 220 and/or the updated model of step 250 can be used by one or more other computer processing systems to implement the results of and/or otherwise exploit the present invention in step 260 and/or step 270.

Figure 3:
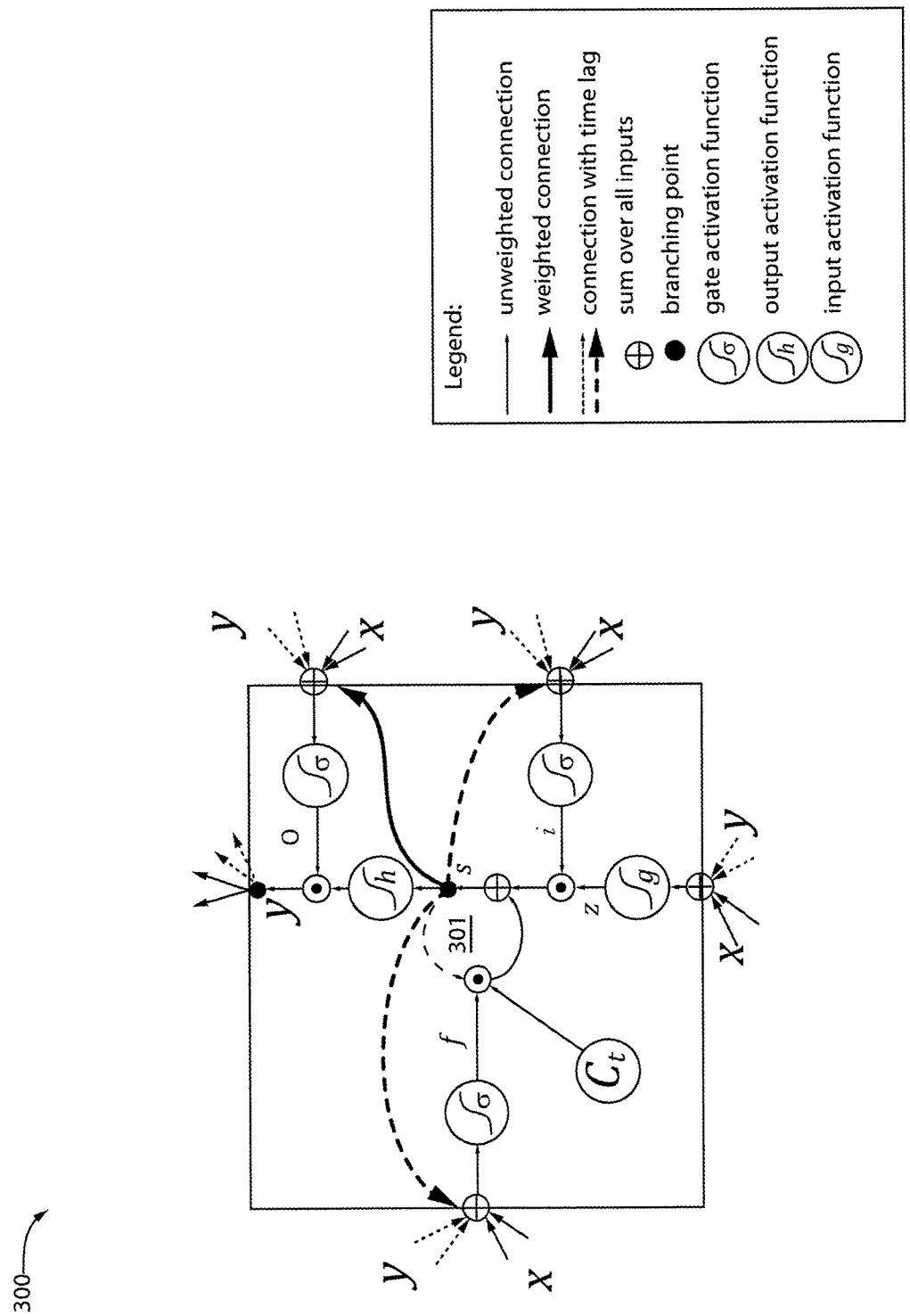
FIG. 3 shows an exemplary LSTM block in a Clock-LSTM structure, in accordance with an embodiment of the present invention.

FIG. 3 shows an exemplary LSTM block 300 in a Clock-LSTM structure, in accordance with an embodiment of the present invention. The LSTM block 300 includes a memory (e.g., a memory cell) 301.

The following definitions apply regarding FIG. 3 and the elements shown therein:
x: input;
y: cell output;
s: cell state;
i: input gate activation;
f: forget gate activation;
o: output gate activation; and
$c_t$: clock signal.

Moreover, FIG. 3 includes a legend of various objects depicted therein such as, for example, an unweighted connection, a weighted connection, a connection with a time lag, a sum over all inputs, a branching point, a gate activation function, an output activation function, and an input activation function.

The definition of the clock signal having the period of T, that is, $C_t$, is as follows:

$$C_t = \begin{cases} 0 & (t \equiv 0(\bmod T)) \\ 1 & (\text{otherwise}) \end{cases}$$

A description will now be given regarding two experiments involving the present invention.

In the two experiments, the present invention is used to predict the musical note at a time step of t+1 from the musical note at a time step of t.

The procedure used in the two experiments involved evaluating music models by an accuracy given by ACC (Equation 1), since the present invention is readily applicable to automatic composition. However, it is to be appreciated that measurements of accuracy relating to the present invention can use other equations than Equation 1, depending upon the implementation, while maintaining the spirit of the present invention.

The process of learning and predicting music was conducted by leave-one-out cross-validation of 144 sets using three pieces of music. The hyper parameters were the number of cells, the learning rate, and the range of initial weights. The performances of three models, namely (1) LSTM, (2) LSTM with divided musical score, and Clock-LSTM, were compared by the best ACC calculated from cross-validation.

The dataset used for the experiments included simple structured music for practice in experiment 1, and ordinary classical music in experiment 2.

The two experiments were performed using the present invention (namely Clock-LSTM) and two prior art methods (namely an LSTM method and a LSTM with divided musical score method).

The results of predicting musical notes in the two experiments are shown in TABLE 1. The first column shows the method used, the second column shows the results of experiment 1, and the third column shows the results of experiment 2.

TABLE 1

|  | Experiment 1 | Experiment 2 |
| --- | --- | --- |
| LSTM | 0.24 | 0.19 |
| LSTM with divided musical score | 0.24 | 0.17 |
| Clock-LSTM | 0.26 | 0.22 |

The best ACC in both experiments 1 and 2 were marked (TABLE 1). The increase rates of ACC relative to the first prior art method (LSTM) and the second method (LSTM with divided musical score) are 7.7% in experiment 1 and 15.8% in experiment 2.

The period T was 24 in experiment 1 and 72 in experiment 2.

The ACC was determined as follows:

$$ACC^{**} = \frac{\sum_{t=1}^{T} TP(t)}{\sum_{t=1}^{T} \{TP(t) + FP(t) + FN(t)\}} \quad \text{(Eq. 1)}$$

where:
TP(t), i.e., true positives: The number of musical notes that is correctly predicted when it is played in the ground-truth set at time step t.
FP(t), i.e., false positives: The number of musical notes that is falsely predicted when it is not played in the ground-truth set at time step t.
FN(t), i.e., false negatives: The number of musical notes that is falsely predicted when it is played in the ground-truth set at time step t.

A description will now be given regarding the structure of music, to which the present invention can be applied, in accordance with an embodiment of the present invention.

Figure 4:
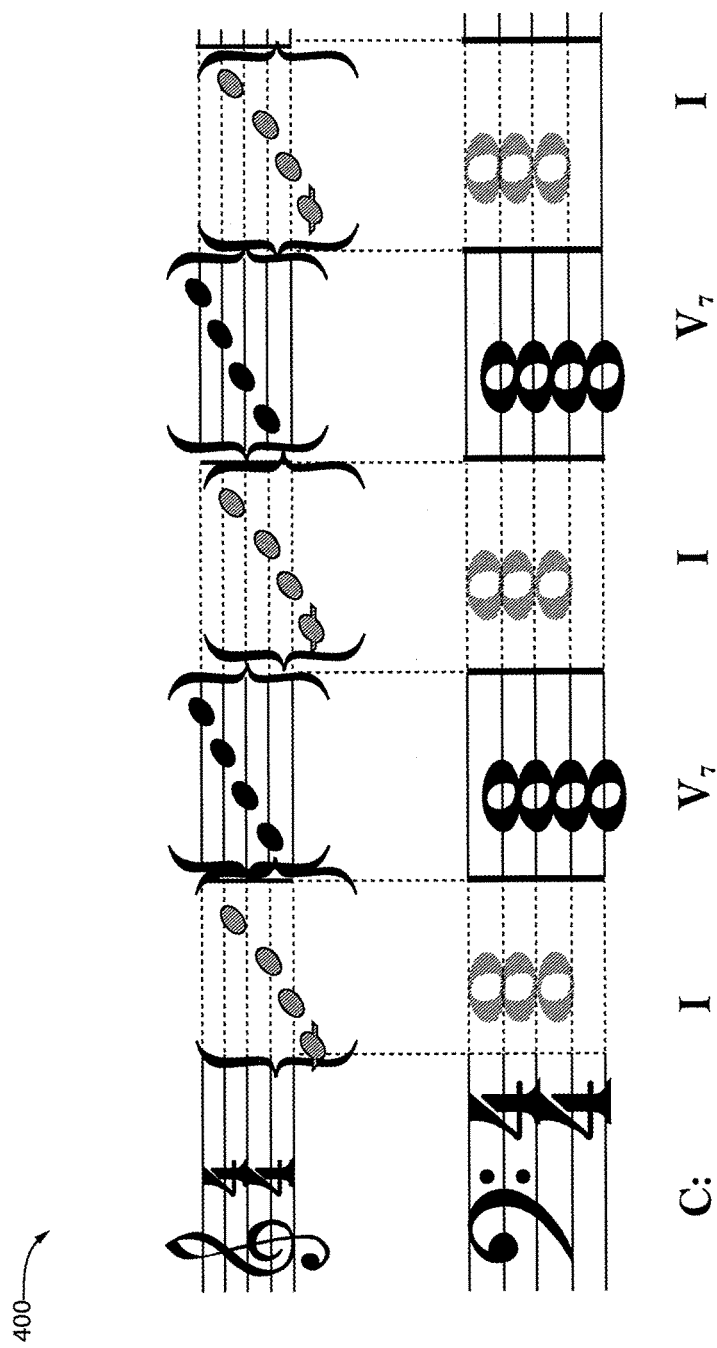
FIG. 4 shows an example of the rule of cadence in music, to which the present invention can be applied, in accordance with an embodiment of the present invention.

FIG. 4 shows an example 400 of the rule of cadence in music, to which the present invention can be applied, in accordance with an embodiment of the present invention.

Referring to FIG. 4, ordinary pieces of music are typically composed to comply with some rules. For example, in cadence, which is one of the rules of progression of chords, there are chords like I={C, E, G} and $V_7$={G, B, D, F}. When the chord of I is played, the melody often includes the notes of I. Here, the note is to a chord what the data is to context. Cadence has another rule such that $V_7$ is played following I. In order to predict whether or not the context remains I or changes to $V_7$, an LSTM needs to treat the transition of context, and it can be realized by resetting the memory.

Further regarding the structure of music to which the present invention can be applied, a musical form is the longer context which describes the structure of music by dividing it into sections. Most pieces of classical music follow one of several possible musical forms such as binary form, ternary form, rondo form and sonata form, and all of the forms have hierarchical and periodical structures. For example, sonata form includes three main sections: an exposition; a development; and a recapitulation. A theme presented in the exposition is repeated in the recapitulation, and the theme is divided into a first theme and a second theme. An understanding of these structures can be useful for composition.

A description will now be given of the fixed period T used by the present invention, in accordance with an embodiment of the present invention.

We defined the fixed period T based on the following knowledge of music:
(1) the multiples of meter;
(2) the length of sections based on the musical forms; and
(3) the length of sections based on Generative Theory of Tonal Music (GTTM).

A description will now be given of a method to divide a piece of music into sections based on GTTM.

The points that satisfy the following conditions are candidates of the boundary of sections:
(i) the length of the note from the beginning to the end is long (slur, rest, etc.) (e.g., above a threshold amount interchangeably referred to as a "note length threshold");
(ii) the note difference between just before the note and just after the note is large (e.g., above a threshold amount interchangeably referred to as a "note difference threshold");
(iii) the melody repeats; and
(iv) the sections can become nearly equal in length (e.g., within a threshold amount interchangeably referred to as a "section length threshold").

A description will now be given of the data used in experiment 1 and experiment 2, in accordance with an embodiment of the present invention.

The dataset used in experiment 1 included simple structured music for practice, namely: Bayer 32; Bayer 33; and Bayer 34. These three pieces of music have a fixed period of 24 quarter notes based on musical forms.

The dataset used in experiment 2 includes ordinary classical music (see TABLE 2). TABLE 2 shows the dataset used in experiment 2. In particular regarding TABLE 2, the first column shows the titles of the pieces of music used as the dataset in experiment 2, the second columns shows the composer of the pieces of music, and the third column shows the meters of the pieces of music.

TABLE 2

| Title | Composer | meters |
|---|---|---|
| Prelude | Debussy | 4/4 |
| Passepied | Debussy | 4/4 |
| Claire de Lune | Debussy | 9/8 |

The experiments show the effect of the present invention on the pieces of music which have a complex progression of chords, and have different meters. Classical music is becoming more complex and free from formality, so predicting classical music in modern times is increasing difficult. Debussy is one of the most popular composers in modern times. Thus, pieces of music composed by Debussy were used, with the selected ones having different meters.

The data was prepared as follows:
(i) the notes were sampled by a sampling period of quaver; and
(ii) the scales were converted into C major.

The fixed period used was a common multiple of the meters, namely 72.

TABLE 3 shows the number of boundaries of the sections in experiment 2, using a fixed period of 72. In TABLE 3, the first column shows the titles of the pieces of music used as the dataset in experiment 2, the second column shows the number of boundaries of sections divided by the fixed period, and the third column shows the number of boundaries of sections divided by the fixed period which meets the boundaries set by GTTM. TABLE 3 shows that all of the boundaries by the fixed period do not necessarily meet the boundaries by GTTM. Thus, the present invention is effective on music such that if A is the boundaries by GTTM, then A is the bar line.

TABLE 3

| | The number of section boundaries divided by the fixed period | The number of section boundaries divided by the fixed period which meets the boundaries by GTTM |
|---|---|---|
| Prelude | 9 | 2 |
| Passepied | 17 | 2 |
| Claire de Lune | 9 | 5 |

A description will now be given regarding the relationship between resetting the memory and the periodic character of the data, in accordance with an embodiment of the present invention.

Figure 5:
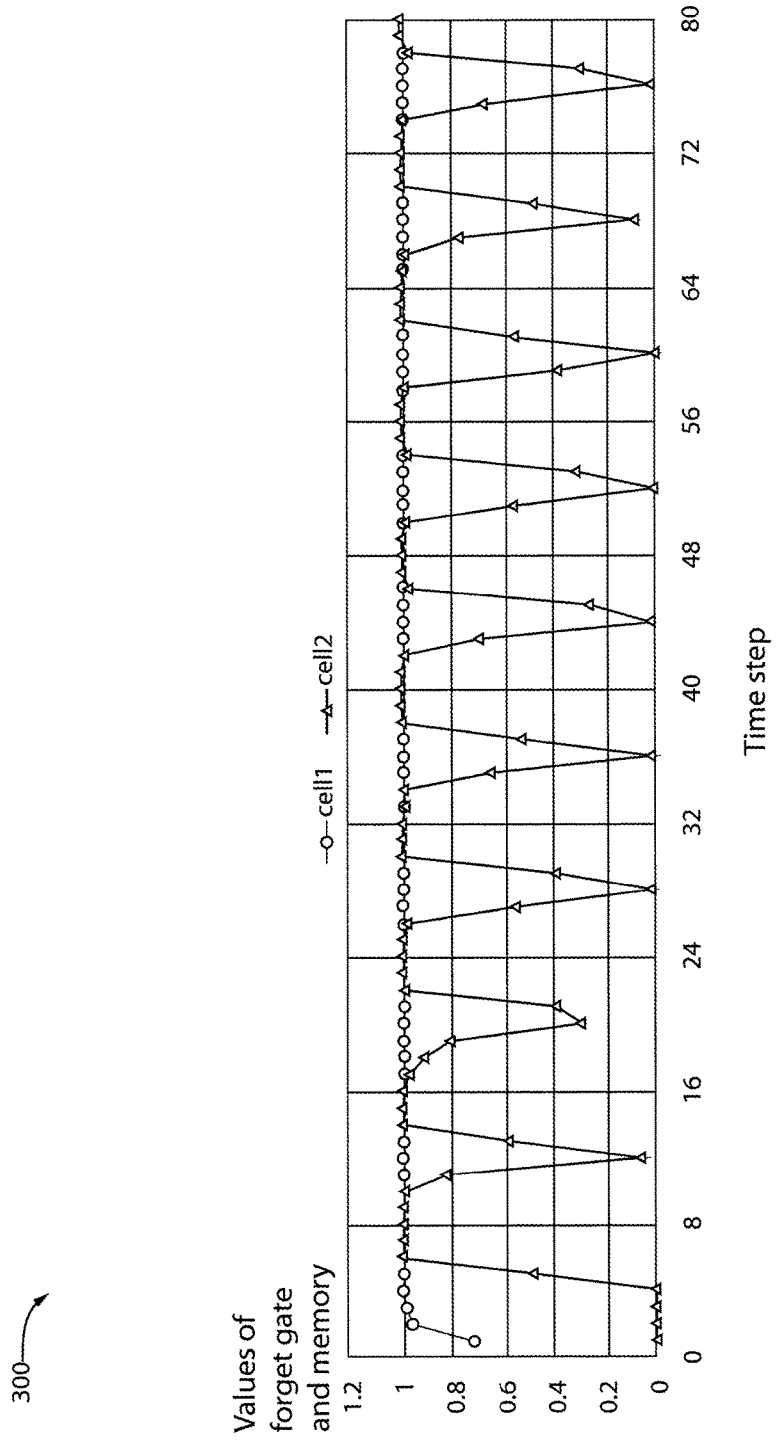
FIG. 5 shows a plot of values of the forget gate of a LSTM that has learned data having a fixed period of 8 versus time step, in accordance with an embodiment of the present invention.

FIG. 5 shows a plot 500 of values of the forget gate of a LSTM that has learned data having a fixed period of 8 versus time step, in accordance with an embodiment of the present invention. In particular, the values of the forget fate of the LSTM that has learned data having a fixed period of 8 are shown with respect to the x-axis, while the values of the forget gate and memory are shown with respect to the y-axis. As shown in FIG. 5, when a standard LSTM has learned the periodic data, the value of the forget gate repeats a value of zero at the fixed period. In other words, it resets the memory periodically. The values are shown for a first memory cell depicted using a line having circles thereon, and a second memory cell depicted using a line having triangles thereon.

A description will now be given regarding the difference between a standard LSTM with divided musical score and a clock-LSTM.

The difference between a standard LSTM with divided musical score and Clock-LSTM Character only LSTM (that is, LSTM built only on character inputs) does not have, but LSTM with divided musical score and Clock-LSTM have:

LSTM: $s^t = z^t \odot i^t + s^{t-1} f^t$

LSTM with divided musical score and Clock-LSTM have:

$$s^t = z^t \odot i^t \text{ and } \frac{\partial s^t}{\partial X_*} = 0$$

Character only LSTM with divided musical score has:

$y(t-1)=0$ and $s(t-1)=0$

Character only Clock-LSTM has:

$f(t)=0$

LSTM with divided musical score cannot use history such as y(t−1) and s(t−1), and has difficulty with predicting notes of music by using the context compared to Clock-LSTM such that:
(i) s(t−1) effects peepholes; and
(ii) y(t−1) effects z (the input), i, f, and o (the values of the input gate, the forget gate and the output gate).

The following definitions apply to the aforementioned description of the difference between a standard LSTM with divided musical score and a clock-LSTM:

Input weights: $W_z, W_i, W_f, W_o \in \mathbb{R}^{N \times M} W_k \in \mathbb{R}^{M \times N}$
Recurrent weights: $R_z, R_i, R_f, R_o \in \mathbb{R}^{N \times N}$
Peephole weights: $p_i, p_f, p_o \in \mathbb{R}^N$
Bias weights: $b_z, b_i, b_f, b_o \in \mathbb{R}^N b_k \in \mathbb{R}^M$ The following definitions and equations apply to the forward pass of the present invention:

$\bar{z}^t = W_z x^t + R_z y^{t-1} + b_z$ $z^t = g(\bar{z}^t)$ $\bar{i}^t = W_i x^t + R_i y^{t-1} + p_i \odot s^{t-1} + b_i$ $i^t = \sigma(\bar{i}^t)$ $\bar{f}^t = W_f x^t + R_f y^{t-1} + p_f \odot s^{t-1} + b_f$ $f^t = a(\bar{f}^t) \to f^t = c_i \odot \tau(\bar{f}^t)$ see note 1

$s^t = z^t \odot i^t + s^{t-1} \odot f^t$ $\bar{o}^t = W_o x^t + R_o y^{t-1} + p_o \odot s^{t-1} + b_o$ $o^t = \tau(\bar{o}^t)$ $y^t = h(\bar{c}^t) \odot o^t$ $\bar{k}^t = W_k y^t + b_k$ $k^t = \tau(\bar{k}^t)$ $\odot$: the pointwise multiplication of two vectors $\tau(x) = 1/(1+e^{-x}), h(x) = x$ $g(x) = \tan h(x)$ The following definitions and equations apply to the backpropagation of the present invention:

$\delta k^t = v^t - k^t \; v^t$: target vector $\delta y^t = \delta k^t \odot \sigma'(\bar{k}^t) \odot W_k$ $\delta o^t = \delta y^t \odot h(s^t) \odot h'(s^t)$ $\delta s^t = \delta y^t \odot o^t \odot h'(s^t)$ $\delta f = \delta s^t \odot s^{t-1} \odot \sigma'(\bar{f})$ —see note 2

$\delta i^t = \delta s^t \odot z^t \odot \sigma'(\bar{i}^t)$

The following definitions and equations apply to the backpropagation of the present invention:

$X_* \in W_*, R_* \quad I \in x^t, y^{t-1}$ $\Delta W_k = \langle \delta k^t \odot \sigma'(\bar{k}^t), y^t \rangle \times \alpha \quad \alpha$: learning rate $\Delta X_o = \langle \delta o^t, I \rangle \times \alpha$ $\frac{\partial s^t}{\partial X_*} = f^t \odot \frac{\partial s^{t-1}}{\partial X_*} + \left( I, \sigma'(\overline{*^t}) \odot \begin{cases} z^t (\text{if } * = i) \\ s^{t-1} (\text{if } * = f) \\ i^t (\text{if } * = z) \end{cases} \right)$ see notes 1 and 2

$\Delta X_* = \frac{\partial s^t}{\partial X_*} \odot \delta s^t \times \alpha$ $\Delta p_* = c^{t-1} \odot \delta * \times \alpha$ $\langle \rangle$: the outer of product of two vectors Note 1: $f^t$ includes improvements relating to the present invention Note 2: $\Delta R_f$ and $\Delta p_f$ include $\sigma'(\bar{f}^t)$ It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 865; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and music modelling 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected is set forth in the appended claims.

What is claimed is:

1. A computer implemented method for generating a prediction of a next musical note by a computer having at least a processor and a memory, the method comprising:
storing sequential musical notes in the memory;
dividing, by the processor, the sequential musical notes into sections of a given length based on a Generative Theory of Tonal Music; and
generating, by the processor, the prediction of the next musical note based upon a music model, the sections, and the sequential musical notes stored in the memory, wherein the given length is determined based on one or more conditions selected from the group consisting of: a note length for a beginning to an end of a note is greater than a note length threshold; a note difference between a time immediately before the note and a time immediately after the note is greater than a note difference threshold; a repeating melody; and music sections are substantially equal in length within a section length threshold.

2. The computer-implemented method of claim 1, wherein the next musical note corresponds to a time step at t+1, and the sequential musical notes stored in the memory correspond to one or more time steps up to a time step at t.

3. The computer-implemented method of claim 1, further comprising training the musical model using the sequential musical notes.

4. The computer-implemented method of claim 1, wherein the memory comprises a First-In First-Out Queue and uses eligibility trace data.

5. The computer-implemented method of claim 1, further comprising updating, by the processor, the music model based upon the prediction of the next musical note and an actual one of the next musical note.

6. The computer-implemented method of claim 1, further comprising resetting, by the processor, the memory at fixed time intervals.

7. The computer-implemented method of claim 6, wherein the fixed time intervals are determined based on multiples of a music meter.

8. The computer-implemented method of claim 6, wherein the fixed time intervals are determined based on music section length, the music section length being determined based on music forms.

9. The computer-implemented method of claim 6, wherein the fixed time intervals are determined based on music section length, the music section length being determined using a Generative Theory of Tonal Music.

10. The computer-implemented method of claim 6, wherein the fixed time intervals are determined based on one or more forget gate values of a Long Short-Term Memory multiplied by a clock signal.

11. The computer-implemented method of claim 6, wherein the memory is reset at the fixed time intervals by firing a forget gate in a Long Short-Term Memory Recurrent Neural Network at the fixed time intervals.

12. The computer-implemented method of claim 6, wherein the memory is reset at the fixed time intervals corresponding to respective learnings of context transitions by the Long Short-Term Memory Recurrent Neural Network.

13. The computer-implemented method of claim 1, further comprising using the next musical note in an automatic music composition generation process to generate a music composition.

14. The computer-implemented method of claim 13, further comprising audibly reproducing the music composition on a speaker.

15. A computer program product for generating a prediction of a next musical note by a computer having at least a processor and a memory, the computer program product comprising a non-transitory computer readable storage medium having program instructions embodied therewith, the program instructions executable by the computer to cause the computer to perform a method comprising:
storing sequential musical notes in the memory;
dividing, by the processor, the sequential musical notes into sections of a given length based on a Generative Theory of Tonal Music; and
generating, by the processor, the prediction of the next musical note based upon a music model, the sections, and the sequential musical notes stored in the memory, wherein the given length is determined based on one or more conditions selected from the group consisting of: a note length for a beginning to an end of a note is greater than a note length threshold; a note difference between a time immediately before the note and a time immediately after the note is greater than a note difference threshold; a repeating melody; and music sections are substantially equal in length within a section length threshold.

16. The computer program product of claim 15, wherein the method further comprises resetting, by the processor, the memory at fixed time intervals.

17. The computer program product of claim 16, wherein the fixed time intervals are determined based on music section length, the music section length being determined based on music forms.

18. The computer program product of claim 16, wherein the fixed time intervals are determined based on music section length, the music section length being determined using a Generative Theory of Tonal Music.

19. The computer program product of claim 16, wherein the fixed time intervals are determined based on one or more forget gate values of a Long Short-Term Memory multiplied by a clock signal.

20. A computer processing system for generating a prediction of a next musical note, the system comprising:

a processor operably coupled to a memory, the processor configured to:

store sequential musical notes in the memory;

divide the sequential musical notes into sections of a given length based on a Generative Theory of Tonal Music; and generate the prediction of the next musical note based upon a music model, the sections, and the sequential musical notes stored in the memory, wherein the given length is determined based on one or more conditions selected from the group consisting of: a note length for a beginning to an end of a note is greater than a note length threshold; a note difference between a time immediately before the note and a time immediately after the note is greater than a note difference threshold; a repeating melody; and music sections are substantially equal in length within a section length threshold.

* * * * *